(12) United States Patent
Sato et al.

(10) Patent No.: US 6,410,641 B2
(45) Date of Patent: Jun. 25, 2002

(54) CURED RUBBER AND METHOD OF TREATING CURED RUBBER

(75) Inventors: Shinichi Sato; Masatoshi Arai, both of Usui-gun (JP)

(73) Assignee: Shin-Etsu Chemical Co., Ltd, Tokyo (JP)

( * ) Notice: Subject to any disclaimer, the term of this patent is extended or adjusted under 35 U.S.C. 154(b) by 0 days.

(21) Appl. No.: 09/777,904

(22) Filed: Feb. 7, 2001

(30) Foreign Application Priority Data

Feb. 8, 2000 (JP) .................................... 2000-030720

(51) Int. Cl.[7] .............................................. C08L 83/08
(52) U.S. Cl. ....................... 524/588; 524/262; 525/477; 427/387; 106/287.11
(58) Field of Search .................. 525/477; 106/287.11; 524/588, 262; 427/387

(56) References Cited

U.S. PATENT DOCUMENTS 4,789,564 A * 12/1988 Kanner et al. ........... 427/255.6
5,319,427 A * 6/1994 Sakurai et al. ............... 355/285
5,635,547 A * 6/1997 Takahashi et al. .......... 523/213
6,270,860 B1 * 8/2001 Nakata et al. .............. 427/536

FOREIGN PATENT DOCUMENTS

JP          7-146602        *  6/1995

* cited by examiner

*Primary Examiner*—Margaret G. Moore
(74) *Attorney, Agent, or Firm*—Millen, White, Zelano & Branigan, P.C.

(57) ABSTRACT

A curable rubber composition comprising a curable organopolysiloxane or perfluoropolyether group-containing organosilicon compound, a curing agent therefor, and a silica filler having a mean particle size of 0.001–10 μm is cured into a cured rubber. For improving compression set, the cured rubber is post treated with a hydrolyzable aminosilane or amidosilane having a Si—N bond.

3 Claims, No Drawings

CURED RUBBER AND METHOD OF TREATING CURED RUBBER

This invention relates to silica-filled, cured rubber, and more particularly, to cured rubber having improved compression set and a treating method for manufacturing the same.

BACKGROUND OF THE INVENTION

The compression set of silica-filled rubber largely differs with the amount and type of silica filler, wettability of silica filler with rubber, and other factors. For the purpose of improving the compression set, investigations have heretofore been made on the amount and type of silica filler and a variety of wetters for improving the wettability of silica filler.

Prior art approaches are successful in improving the compression set to some extent, however, better compression sets are required in some applications. There is a desire to have cured rubber having an improved compression set.

SUMMARY OF THE INVENTION

It has been found that when a cured rubber made of a curable rubber composition comprising a curable organopoly-siloxane or perfluoropolyether group-containing organosilicon compound, a curing agent therefor, and a silica filler having a mean particle size of 0.001 to 10 μm is post treated by immersing it in a hydrolyzable aminosilane or amidosilane having a Si—N bond, preferably in the presence of a rubber swelling solvent, the cured rubber is significantly improved in compression set.

In a first aspect, the invention provides a cured rubber made of a curable rubber composition comprising a curable organopolysiloxane, a curing agent therefor, and a silica filler having a mean particle size of 0.001 to 10 μm, the cured rubber being post treated with a hydrolyzable aminosilane or amidosilane having a Si—N bond.

In a second aspect, the invention provides a cured rubber made of a curable rubber composition comprising a curable perfluoropolyether group-containing organosilicon compound, a curing agent therefor, and a silica filler having a mean particle size of 0.001 to 10 μm, the cured rubber being post treated with a hydrolyzable aminosilane or amidosilane having a Si—N bond.

In a third aspect, the invention provides a method for treating a cured rubber obtained by curing a curable rubber composition as set forth above. The method involves the step of immersing the cured rubber in a hydrolyzable aminosilane or amidosilane having a Si—N bond in the presence of a rubber swelling solvent.

DESCRIPTION OF THE PREFERRED EMBODIMENT

The cured rubber of the invention is made of either (I) a silicone rubber composition comprising a curable organopolysiloxane, a curing agent therefor, and a silica filler, or (II) a fluororubber composition comprising (A) a curable perfluoropolyether group-containing organosilicon compound, (B) a curing agent therefor, and (C) a silica filler.

In the silicone rubber composition (I), the curable organopolysiloxane is preferably of the following average compositional formula.

$$R_nSiO_{(4-n)/2}$$

In the formula, R, which may be the same or different, stands for substituted or unsubstituted monovalent hydrocarbon groups, preferably of 1 to 12 carbon atoms and more preferably 1 to 8 carbon atoms, for example, alkyl groups such as methyl, ethyl, propyl and butyl; cycloalkyl groups such as cyclohexyl; alkenyl groups such as vinyl, allyl, butenyl and hexenyl; aryl groups such as phenyl and tolyl; aralkyl groups such as benzyl and β-phenylpropyl; and substituted ones of the foregoing groups in which some or all of the hydrogen atoms attached to carbon atoms are replaced by halogen atoms, cyano groups or the like, such as chloromethyl, trifluoropropyl and cyanoethyl. The organopolysiloxane should preferably have at least two alkenyl groups per molecule. Of the R groups, alkenyl groups, especially vinyl groups should preferably account for 0.001 to 10 mol %, especially 0.01 to 5 mol %. The organopolysiloxane is usually end-capped with trimethylsilyl, dimethylvinylsilyl, dimethylhydroxysilyl or trivinylsilyl groups. The letter n is a positive number from 1.98 to 2.02.

The organopolysiloxane preferably has a degree of polymerization of at least about 100, more preferably about 100 to 100,000, and most preferably about 3,000 to 20,000.

Exemplary organopolysiloxanes are given by the structural formulas below.

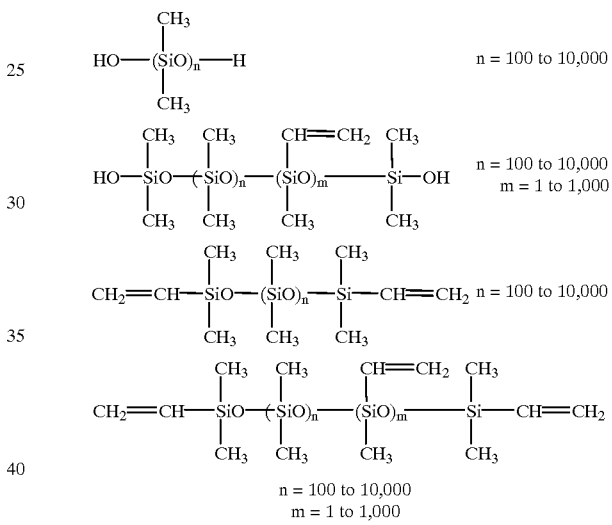

The curing agent used herein is selected as appropriate for the curing mechanism of silicone rubber. For the heat vulcanization type, for example, a curing method using an organic peroxide and an addition curing method using an addition reaction curing agent combined with a catalyst are useful. Typical for the room temperature vulcanization type is a condensation curing method using a condensation crosslinker and a condensation reaction promoting catalyst.

The organic peroxide curing method uses organic peroxide curing agents, for example, chlorine-free organic peroxides such as benzoyl peroxide, p-methylbenzoyl peroxide, o-methylbenzoyl peroxide, 2,5-dimethyl-2,5-di-t-butylperoxyhexane, t-butylperoxybenzoate, dicumyl peroxide, and cumyl t-butyl peroxide. Especially for atmospheric hot air vulcanization, acyl organic peroxides such as benzoyl peroxide, p-methylbenzoyl peroxide, and o-methylbenzoyl peroxide are preferred.

These organic peroxides may be used alone or in admixture of two or more. An appropriate amount of the organic peroxide added is about 0.1 to 10 parts, and especially about 0.3 to 5 parts by weight per 100 parts by weight of the organopolysiloxane. Too small an amount of the organic peroxide may provide short crosslinking whereas too large an amount may bring no further increase in cure rate.

In the addition reaction curing method, conventional addition reaction curing agents are used. Often an organohydrogenpolysiloxane having at least two, preferably at least three Si—H groups per molecule is used. It is typically represented by the formula:

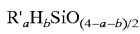

wherein R' is as defined for R, preferably methyl, phenyl or trifluoropropyl, most preferably methyl, and letters "a" and "b" are positive numbers satisfying $0 \leq a < 3$, $0 < b \leq 3$, and $0 < a+b \leq 3$. Examples are methylhydrogenpolysiloxane and copolymers of methylhydrogenpolysiloxane with dimethylpolysiloxane. The organohydrogenpolysiloxane used herein usually has less than about 400 silicon atoms per molecule. Typical organohydrogenpolysiloxanes are exemplified by the following formula.

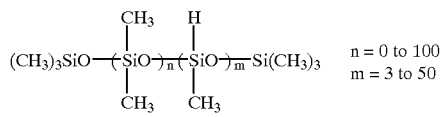

The organohydrogenpolysiloxane is preferably added in such amounts that 0.5 to 3 mol of Si—H groups are available per mol of alkenyl groups in the organopolysiloxane.

For the rubber to be cured through addition reaction or hydrosilylation reaction, addition reaction promoting catalysts, typically platinum group compounds are preferably used. The platinum group compound serves to promote the addition reaction or hydrosilylation reaction of the curing agent to the polymer backbone. Since noble metal compounds are generally expensive, commercially readily available platinum compounds are often used. Examples include chloroplatinic acid, complexes of chloroplatinic acid with olefins such as ethylene, complexes of chloroplatinic acid with alcohols or vinylsiloxanes, and solid catalysts in the form of platinum on silica, alumina or carbon. To obtain more uniform cured products, a solution of chloroplatinic acid or a complex thereof in a suitable solvent is admixed with the first component prior to use.

Known catalysts in the form of platinum group compounds other than the platinum compounds include rhodium, ruthenium, iridium and palladium compounds, for example, RhCl(PPh$_3$)$_3$, RhCl(CO)(PPh$_3$)$_2$, RhCl(C$_2$H$_4$)$_2$, Ru$_3$(CO)$_{12}$, IrCl(CO)(PPh$_3$)$_2$, and Pd(PPh$_3$)$_4$.

The amount of the catalyst used is not critical. Partially because of expensiveness, the catalyst is usually used in an amount of about 1 to 1,000 ppm, desirably about 10 to 500 ppm based on the organopolysiloxane.

For the rubber to be cured through condensation reaction, any of acetic acid, alcohol, oxime and acetone type curing agents may be selected so as to comply with a particular curing mechanism. Specifically, suitable condensation reaction curing agents are shown below.

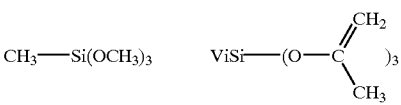

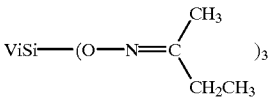

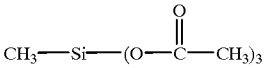

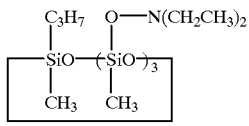 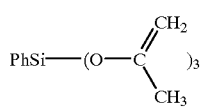

Vi: vinyl   Ph: phenyl

An appropriate amount of the condensation reaction curing agent used is about 2 to 15 parts by weight per 100 parts by weight of the organopolysiloxane.

For the rubber to be cured through condensation reaction, condensation reaction promoting catalysts are usually added in catalytic amounts. The catalysts include organic tin compounds, titanium compounds, and guanidyl group-containing compounds. Specific examples of the catalyst are shown below.

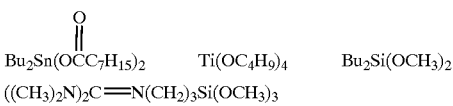

Next, reference is made to the fluororubber composition (II). The perfluoropolyether group-containing organosilicon compound used herein is preferably a fluorinated amide compound of the following general formula (1), as disclosed in JP-A 8-198926 of the same assignee as the present invention which is incorporated herein by reference.

(1)

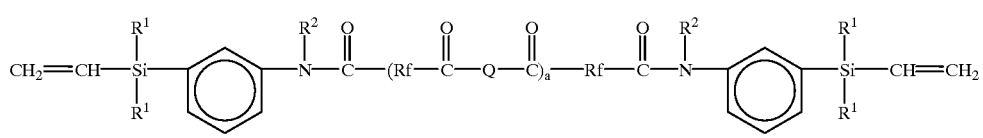

Herein, R$^1$ is a monovalent hydrocarbon group of 1 to 10 carbon atoms selected from among alkyl, cycloalkyl, alkenyl, aryl and aralkyl groups, and substituted ones of the foregoing groups in which some or all of the hydrogen atoms are replaced by halogen atoms. $R^2$ is hydrogen or a monovalent hydrocarbon group as defined for $R^1$. Q is a group of the following general formula (2) or (3).

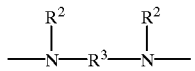
(2)

Herein, $R^3$ is a divalent hydrocarbon group of 1 to 20 carbon atoms, which may be separated by at least one of oxygen, nitrogen and silicon atoms, selected from among alkylene, cycloalkylene, and arylene groups, substituted ones of the foregoing groups in which some of the hydrogen atoms are replaced by halogen atoms, and combinations of such alkylene groups with arylene groups.

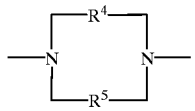
(3)

Herein, each of $R^4$ and $R^5$ is a divalent hydrocarbon group of 1 to 10 carbon atoms selected from among alkylene, cycloalkylene, and substituted ones of the foregoing groups in which some of the hydrogen atoms are replaced by halogen atoms.

Rf is a divalent perfluoroalkylene group of the formula: —$C_mF_{2m}$— wherein m is 1 to 10, or a divalent perfluoropolyether group selected from groups of the formulas shown below, and the letter "a" is an integer of 0 to 10.

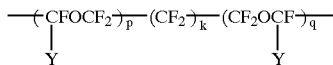

Y is F or $CF_3$ group, p, q and k are integers satisfying $p \geq 1$, $q \geq 1$, $2 \leq p+q \leq 200$, and $0 \leq k \leq 6$.

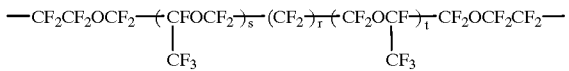

The letters r, s and t are integers satisfying $0 \leq r \leq 6$, $s \geq 0$, $t \geq 0$, and $0 \leq s+t \leq 200$.

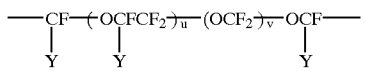

Y is F or $CF_3$ group, u and v are integers of 1 to 20.

The letter w is an integer of 1 to 100.

In formula (1), $R^1$ is a monovalent hydrocarbon group of 1 to 10 carbon atoms, especially 1 to 8 carbon atoms, and preferably free of aliphatic unsaturation; and $R_2$ is hydrogen or a monovalent hydrocarbon group like $R^1$. Examples of the monovalent hydrocarbon groups represented by $R^1$ and $R^2$ include alkyl groups such as methyl, ethyl, propyl, isopropyl, butyl, isobutyl, tert-butyl, pentyl, hexyl, octyl and decyl; cycloalkyl groups such as cyclopentyl, cyclohexyl and cycloheptyl; alkenyl groups such as vinyl, allyl, propenyl, isopropenyl, butenyl, isobutenyl, hexenyl and cyclohexenyl; aryl groups such as phenyl, tolyl, xylyl and naphthyl; aralkyl groups such as benzyl, phenylethyl, phenylpropyl and methylbenzyl; and substituted ones of the foregoing groups in which some or all of the hydrogen atoms are replaced by halogen atoms, typically halo-substituted alkyl groups such as chloromethyl, chloropropyl, bromoethyl, 3,3,3-trifluoropropyl and 6,6,6,5,5,4,4,3,3-nonafluorohexyl.

In formula (1), Q is a group of the general formula (2) or (3).

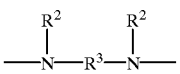
(2)

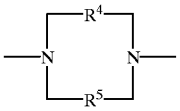
(3)

In formula (2), $R^2$ is as defined above. $R^3$ is a substituted or unsubstituted divalent hydrocarbon group of 1 to 20 carbon atoms, and especially 2 to 10 carbon atoms, for example, alkylene groups such as methylene, ethylene, propylene, methylethylene, butylene and hexamethylene; cycloalkylene groups such as cyclohexylene; arylene groups phenylene, tolylene, xylylene, naphthylene, and biphenylene; substituted ones of the foregoing groups in which some of the hydrogen atoms are replaced by halogen atoms or the like; and combinations of such substituted or unsubstituted alkylene groups with arylene groups.

$R^3$ may be a group as above in which at least one atom selected from among oxygen, nitrogen and silicon atoms intervenes midway the linkage. In this case, the oxygen atom may intervene in the form of —O—, and the nitrogen atom may intervene in the form of —NR'— wherein R' is hydrogen or an alkyl group of 1 to 8 carbon atoms, especially 1 to 6 carbon atoms or aryl group. The silicon atom may intervene as a straight or cyclic organosiloxane-containing group or organosilylene group as shown below.

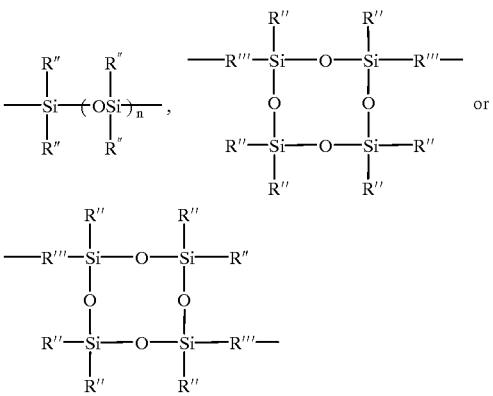

Herein, R" is an alkyl group of 1 to 8 carbon atoms or aryl group as exemplified above for $R^1$ and $R^2$; R'" is an alkylene group of 1 to 6 carbon atoms or arylene group as exemplified above for $R^3$, and n is an integer of 0 to 10, and especially 0 to 5.

Illustrative examples of the groups separated by oxygen, nitrogen and silicon atoms are given below. Me is methyl.

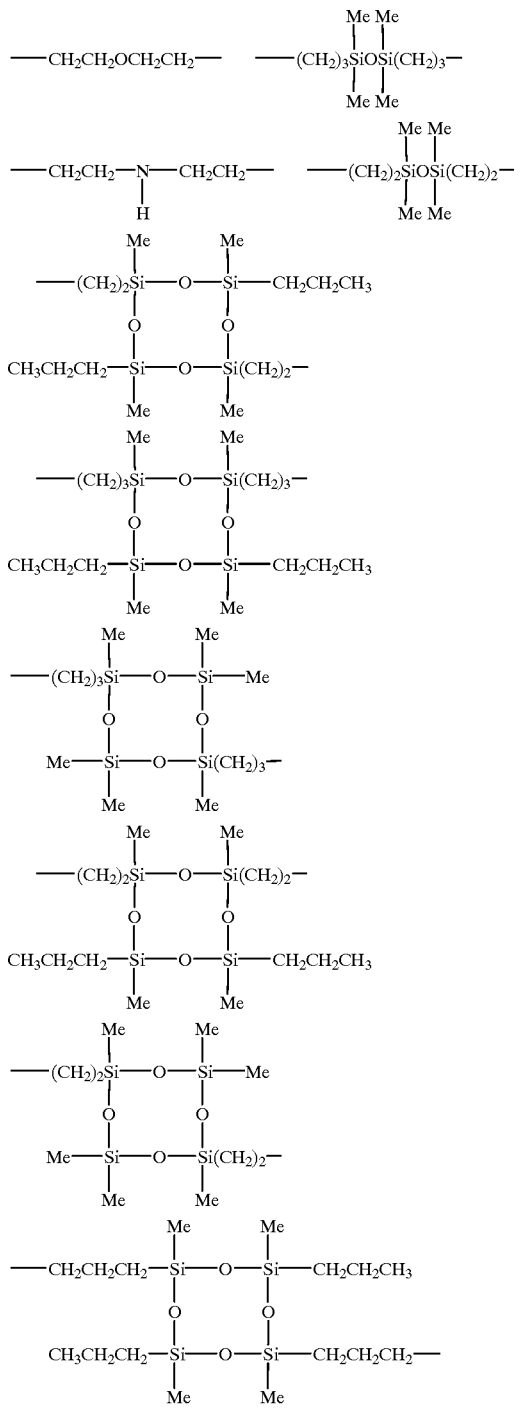

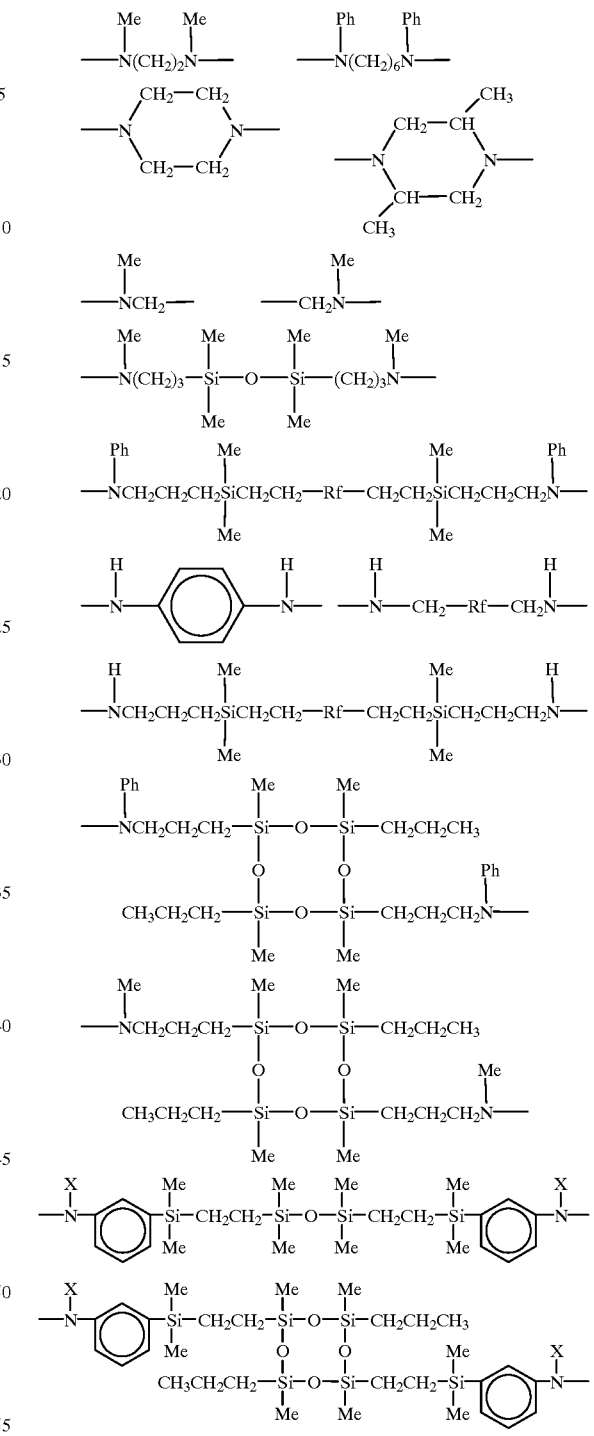

In formula (3), each of $R^4$ and $R^5$ is a divalent hydrocarbon group of 1 to 10 carbon atoms and especially 2 to 6 carbon atoms, for example, alkylene groups such as methylene, ethylene, propylene, methylethylene, butylene, and hexamethylene; cycloalkylene groups such as cyclohexylene; and substituted ones of the foregoing groups in which some of the hydrogen atoms are replaced by halogen atoms.

Illustrative examples of Q in formula (1), represented by formula (2) or (3), are given below. In the following chemical formulas, Me is methyl, Ph is phenyl, Rf is as defined above, and X is hydrogen, methyl or phenyl.

Illustrative examples of Rf in formula (1) are given below.

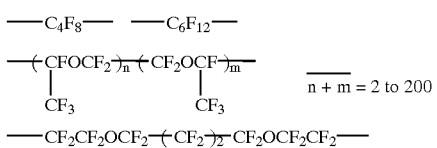

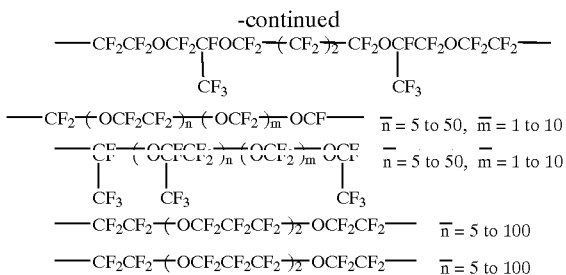

$\overline{n} = 5 \text{ to } 50, \overline{m} = 1 \text{ to } 10$ $\overline{n} = 5 \text{ to } 50, \overline{m} = 1 \text{ to } 10$ $\overline{n} = 5 \text{ to } 100$ $\overline{n} = 5 \text{ to } 100$ It is noted that in formula (1), "a" is an integer of 0 to 10, indicating that the fluorinated amide compound of formula (1) contains at least one divalent perfluoroalkylene group or divalent perfluoropolyether group per molecule. Preferably, "a" is an integer of 1 to 6.

It is appreciated that the fluorinated amide compound of formula (1) can be prepared by the method described in JP-A 8-198926.

Preferably, the fluorinated amide compound of formula (1) has a viscosity in the range of about 100 to 100,000 centistokes at 25° C., more preferably about 200 to 20,000 centistokes at 25° C.

The curing agent is selected so as to comply with the curing reaction of the perfluoropolyether group-containing organosilicon compound. Usually, an organohydrogenpolysiloxane having at least two, preferably at least three, hydroxyl (Si—H) groups in a molecule is used. Suitable addition reaction crosslinking agents are fluorinated organohydrogensiloxanes containing at least one group selected from among monovalent perfluorooxyalkyl, monovalent perfluoroalkyl, divalent perfluorooxyalkylene and divalent perfluoroalkylene groups, as well as at least two hydrosilyl groups.

The perfluorooxyalkyl, perfluoroalkyl, perfluorooxyalkylene and perfluoroalkylene groups are exemplified by the groups of the following general formulas. monovalent perfluoroalkyl groups:

$C_mF_{2m+1}-$

Letter m is an integer of 1 to 20, preferably 2 to 10.
divalent perfluoroalkylene groups:

$-C_mF_{2m}-$

Letter m is an integer of 1 to 20, preferably 2 to 10.
monovalent perfluorooxyalkyl groups:

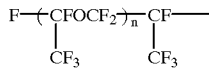

Letter n is an integer of 1 to 5.
divalent perfluorooxyalkylene groups:

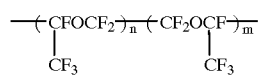

Letters m and n each are an integer of 1 to 50, and m+n is an integer of 2 to 100.

The fluorinated organohydrogensiloxane may be cyclic, chainlike or three-dimensional network. Preferred organohydrogensiloxane has in a molecule at least one organic group containing a perfluoroalkyl, monovalent perfluoroalkyl ether group or perfluoroalkylene group or divalent perfluoroalkyl ether group as represented by the following general formulas as the substituent attached to a silicon atom.

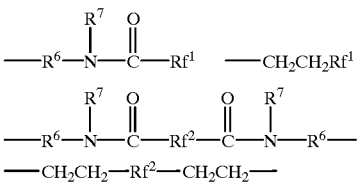

In the above formulas, $R^6$ is a divalent hydrocarbon group of 1 to 10 carbon atoms and especially 2 to 6 carbon atoms, for example, alkylene groups such as methylene, ethylene, propylene, methylethylene, tetramethylene, and hexamethylene; and arylene groups such as phenylene. $R^7$ is hydrogen or a monovalent hydrocarbon group of 1 to 8 carbon atoms and especially 1 to 6 carbon atoms, like $R^2$. $Rf^1$ and $Rf^2$ are independently monovalent perfluoroalkyl, monovalent perfluorooxyalkyl, divalent perfluorooxyalkylene or divalent perfluoroalkylene groups.

In the fluorinated organohydrogensiloxane as component (B), the substituents attached to silicon atoms other than the monovalent organic group having a mono- or divalent fluorinated substituent, that is, perfluoroalkyl, perfluorooxyalkyl, perfluorooxyalkylene or perfluoroalkylene group include monovalent hydrocarbon groups of 1 to 10 carbon atoms, especially 1 to 8 carbon atoms, free of aliphatic unsaturation, as defined for $R^2$. The number of silicon atoms in the molecule of the fluorinated organohydrogensiloxane is not critical although it desirably has about 2 to about 60 silicon atoms, more desirably about 4 to about 60 silicon atoms, and especially about 4 to about 30 silicon atoms.

Illustrative, non-limiting, examples of the fluorinated organohydrogensiloxane are given below.

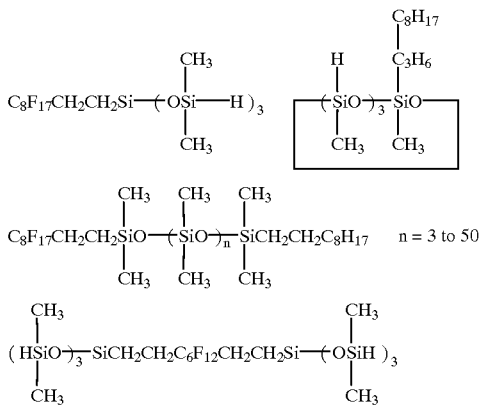

The fluorinated organohydrogensiloxane (B) is preferably blended in such amounts that 0.5 to 5 mol, and more preferably 1 to 2 mol of hydrosilyl (Si—H) groups in (B) are available per mol of aliphatic unsaturated groups including alkenyl and cycloalkenyl groups in the perfluoropolyether group-containing compound (A). Less amounts of component (B) may achieve an insufficient degree of crosslinking. Excessive amounts of component (B) may allow chain lengthening to become preferential, inviting undercure, foaming, and losses of heat resistance and other properties. An appropriate amount of component (B) blended is 0.1 to 50 parts by weight per 100 parts by weight of component (A).

Along with the addition reaction crosslinking agents, addition reaction promoting catalysts such as platinum group compounds as previously described are blended in catalytic amounts if necessary.

The silica filler used herein has a mean particle size of 0.001 to 10 μm, and preferably 0.01 to 1.0 μm. Preferably the silica filler has a specific surface area of at least 50 m²/g, and especially 100 to 500 m²/g as measured by the BET method.

The silica filler may be selected from commonly used reinforcing silica (inclusive of dry silica and wet silica) and non-reinforcing silica. Examples of useful silica include fumed silica obtained by burning of silicon tetrachloride, hydrolytic silica obtained by hydrolysis of silicon tetrachloride, silica flour obtained by grinding naturally occurring quartz, spherical silica obtained by melting of quartz, and surface treated silica obtained by surface treating the respective silicas with chlorosilane, silazane, etc.

An appropriate amount of the silica filler blended is about 5 to 200 parts, and especially about 10 to 100 parts by weight per 100 parts by weight of the composition. With too less an amount of silica, the cured rubber may have a low tensile strength. Too large an amount of silica may reduce the elongation of the cured rubber.

According to the invention, the curable composition comprising the polymer, curing agent therefor, and silica filler described above is cured under suitable conditions for its curing reaction to form a cured rubber, which is post treated with a hydrolyzable aminosilane or hydrolyzable amidosilane having a Si—N bond.

The curing conditions for the curable composition are not critical as long as a sufficient amount of heat to induce decomposition of the curing agent and vulcanization of rubber is applicable; and the molding method is not critical and usually selected, for example, from extrusion molding concomitant with continuous vulcanization, press molding and injection molding. The curing conditions are selected in accordance with the molding method and usually include a temperature of about 80 to 200° C. and a time of about 5 seconds to 30 minutes. If necessary, this is followed by secondary vulcanization at about 150 to 250° C. for about 1 to 10 hours.

The hydrolyzable aminosilane and amidosilane each having a Si—N bond with which the cured rubber is treated are not critical and may have various structures including straight, branched and cyclic structures. Illustrative, non-limiting, examples are given below. Vi is vinyl.

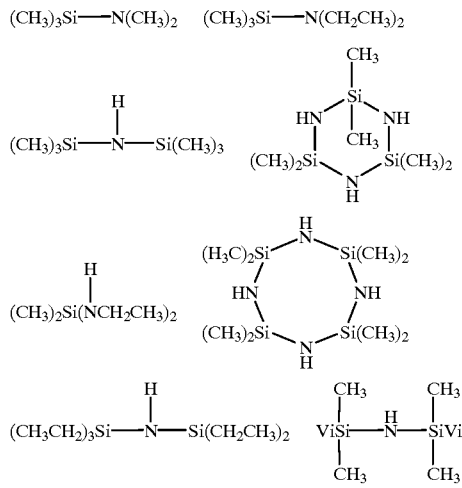

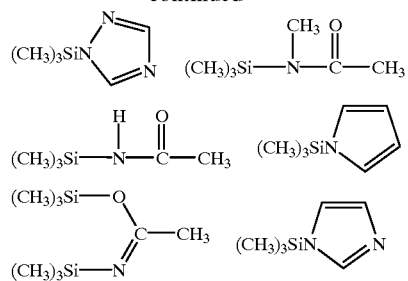

-continued

An appropriate amount of the hydrolyzable aminosilane or amidosilane used is about 0.1 to 2 g, especially about 0.05 to 1 g per gram of the cured rubber. Too small an amount of the silane relative to the cured rubber may fail to achieve sufficient treatment to improve compression set. Too large an amount of the silane is wasteful.

In the practice of the invention, the cured rubber is post treated, for example, by dissolving the hydrolyzable aminosilane or amidosilane in a suitable solvent to form a treating solution, and immersing the cured rubber in the treating solution. The solvent used herein is preferably the one with which the rubber to be treated swells, so that the cured rubber may be treated in the swollen state. Hydrocarbon solvents such as toluene and hexane are effective when the polymer used is a diorganopolysiloxane. Fluorochemical solvents such as m-xylene hexafluoride and perfluorobutyl tetrahydrofuran are useful when the polymer used is a perfluoropolyether polymer.

Treating conditions may be properly selected. Preferred conditions include a treating temperature of about 20 to 120° C., especially about 60 to 100° C. and a treating time of about 1 to 48 hours, especially about 2 to 24 hours. At the end of treatment, the solvent is removed under suitable conditions, yielding the end cured rubber as treated.

The cured rubber as treated is significantly improved in compression set so that it is applicable to a variety of uses, for example, as O-rings and square rings in fuel, lubricant and operating fluid systems of automobiles and aircraft, O-rings in semiconductor devices, rolls in copiers, molded rubber parts for sealing purposes, and diaphragms. With the treating method of the invention, cured rubber parts having superior cured properties are manufactured in an efficient manner.

EXAMPLE

Examples of the invention are given below by way of illustration and not by way of limitation. All parts are by weight, and the viscosity is a measurement at 25° C.

Examples 1–4 and Comparative Example 1

To 100 parts of a polymer of formula (i) shown below having a viscosity of 5,900 centistokes, an average molecular weight of 17,000 and a vinyl group content of 0.012 mol/100 g, was added 20 parts of fumed silica surface treated with dimethylsiloxy groups and having a specific surface area of 200 m²/g and a mean particle size of 0.01 μm. After mixing and heat treatment, the mixture was milled on a three-roll mill. To this were added 3.29 parts of a fluorinated cyclic hydrogensiloxane of formula (ii) shown below, 0.2 part of a toluene solution of a catalyst in the form of chloroplatinic acid modified with $CH_2$=$CHSi(CH_3)_2OSi(CH_3)_2CH$=$CH_2$ (platinum concentration 1.0% by weight), and 0.4 part of a 50% toluene solution of ethynyl cyclohexanol. The ingredients were mixed to give a composition.

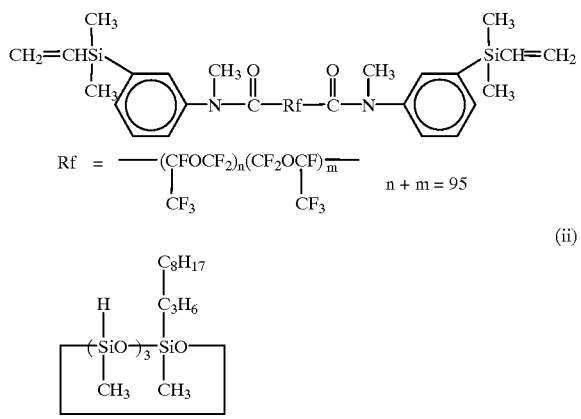

The composition was deaerated in vacuum, placed in a rectangular frame of 2 mm thick, deaerated again, press cured at 100 kg/cm² and 150° C. for 10 minutes, and post cured at 200° C. for 4 hours. A test specimen cut out of the cured sample was measured for physical properties according to JIS K-6301, with the results shown below.

Hardness: 57 on JIS A scale*

Elongation: 290%

Tensile strength: 70 kgf/cm²

* measured by a Type A spring hardness tester as prescribed in JIS K-6301

For compression set measurement, the above composition was molded in a special mold to form O-rings having an inner diameter of 24.99 mm and a diameter of 3.52 mm. Like the cured sheet, the curing procedure involved press curing at 100 kg/cm² and 150° C. for 10 minutes and post curing at 200° C. for 4 hours. The O-rings were treated with a hydrolyzable aminosilane or amidosilane under the following conditions in the combination shown in Table 1, obtaining treated O-rings. Before and after the treatment, the compression set of the O-rings was measured at 25% compression and 200° C. The results are shown in Table 1.

| Hydrolyzable aminosilane and amidosilane | |
|---|---|
| Silane I | Silane II |
| (CH₃)₃Si—N(CH₃)₂ | (CH₃)₃Si—N(H)—Si(CH₃)₃ |
| Silane III | Silane IV |
| (CH₃)₃Si—N(CH₂CH₃)₂ | (CH₃)₃Si—N(CH₃)—C(O)—CH₃ |

Treating Procedure

The O-rings were treated at 90° C. for 24 hours with a solution of the following composition using the hydrolyzable aminosilane or amidosilane, taken out of the solution, and dried at 120° C. for 2 hours for solvent removal, yielding treated O-rings.

| Treating solution | |
|---|---|
| O-rings | two |
| Hydrolyzable aminosilane or amidosilane | 3 g |
| m-xylene hexafluoride | 70 g |
| Perfluorobutyltetrahydrofuran | 30 g |

TABLE 1

| | Post treatment | Compression set (25%, 200° C.) | | | |
|---|---|---|---|---|---|
| | | 22 hr | 70 hr | 240 hr | 500 hr |
| CE1 | untreated | 21 | 38 | 57 | 85 |
| E1 | Silane I | 7 | 13 | 29 | 45 |
| E2 | Silane II | 8 | 15 | 32 | 51 |
| E3 | Silane III | 7 | 14 | 28 | 43 |
| E4 | Silane IV | 8 | 15 | 30 | 48 |

Examples 5–8 and Comparative Example 2

To 100 parts of a dimethylpolysiloxane capped with a vinyldimethylsilyl group at each end, having a viscosity of 5,300 centistokes and a vinyl group content of 0.006 mol/100 g, was added 20 parts of fumed silica surface treated with dimethylsiloxy groups and having a specific surface area of 200 m²/g and a mean particle size of 0.01 μm. After mixing and heat treatment, the mixture was milled on a three-roll mill. To this were added 1.5 parts of a hydrogensiloxane of formula (iii) shown below having a Si—H content of 0.006 mol/g, 0.2 part of a toluene solution of a catalyst in the form of chloroplatinic acid modified with $CH_2$=$CHSi(CH_3)_2OSi(CH_3)_2CH$=$CH_2$ (platinum concentration 1.0% by weight), and 0.4 part of a 50% toluene solution of ethynyl cyclohexanol. The ingredients were mixed to give a composition.

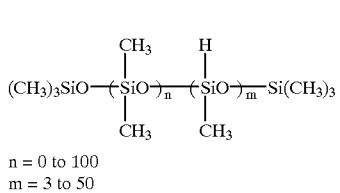

n = 0 to 100
m = 3 to 50

The composition was deaerated in vacuum, placed in a rectangular frame of 2 mm thick, deaerated again, press cured at 100 kg/cm² and 150° C. for 10 minutes, and post cured at 200° C. for 4 hours. A test specimen cut out of the cured sample was measured for physical properties according to JIS K-6301, with the results shown below.

Hardness: 53 on JIS A scale*

Elongation: 180%

Tensile strength: 65 kgf/cm²

* measured by a Type A spring hardness tester as prescribed in JIS K-6301

For compression set measurement, the above composition was molded in a special mold to form O-rings having an inner diameter of 24.99 mm and a diameter of 3.52 mm. Like the cured sheet, the curing procedure involved press curing at 100 kg/cm² and 150° C. for 10 minutes and post curing at 200° C. for 4 hours. The O-rings were treated with a solution of the same hydrolyzable aminosilane or amidosilane as used in Example 1 under the same conditions as in Example 1 in the combination shown in Table 2, obtaining treated O-rings. Before and after the treatment, the compression set of the O-rings was measured at 25% compression and 180° C. The results are shown in Table 2.

| Treating solution | |
|---|---|
| O-rings | two |
| Hydrolyzable aminosilane or amidosilane | 3 g |
| Toluene | 100 g |

TABLE 2

| | Post | Compression set (25%, 180° C.) | | | |
|---|---|---|---|---|---|
| | treatment | 22 hr | 70 hr | 240 hr | 500 hr |
| CE2 | untreated | 18 | 32 | 51 | 70 |
| E5 | Silane I | 11 | 19 | 36 | 51 |
| E6 | Silane II | 10 | 20 | 37 | 53 |
| E7 | Silane III | 10 | 18 | 34 | 46 |
| E8 | Silane IV | 12 | 21 | 39 | 56 |

It is evident from Tables 1 and 2 that the O-rings treated with hydrolyzable aminosilane or amidosilane are significantly improved in compression set over the untreated rings.

Japanese Patent Application No. 2000-030720 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A cured rubber made of a curable rubber composition comprising a curable organopolysiloxane, a curing agent therefor, and a silica filler having a mean particle size of 0.001 to 10 $\mu$m, the cured rubber being post treated with a hydrolyzable aminosilane or amidosilane having a Si—N bond.

2. A cured rubber made of a curable rubber composition comprising a curable perfluoropolyether group-containing organosilicon compound, a curing agent therefor, and a silica filler having a mean particle size of 0.001 to 10 $\mu$m, the cured rubber being post treated with a hydrolyzable aminosilane or amidosilane having a Si—N bond.

3. A method for treating a cured rubber obtained by curing a curable rubber composition as set forth in claim 1 said method comprising the step of:

immersing the cured rubber in a hydrolyzable aminosilane or amidosilane having a Si—N bond in the presence of a rubber swelling solvent.

* * * * *